United States Patent
Dalton et al.

(10) Patent No.: US 10,509,996 B2
(45) Date of Patent: Dec. 17, 2019

(54) REDUCTION OF PARAMETERS IN FULLY CONNECTED LAYERS OF NEURAL NETWORKS

(71) Applicant: Huawei Technologies Co., Ltd., Shenzhen (CN)

(72) Inventors: Barnaby Dalton, Mississauga (CA); Serdar Sozubek, North York (CA); Manuel Saldana, Toronto (CA); Vanessa Courville, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 643 days.

(21) Appl. No.: 15/258,691

(22) Filed: Sep. 7, 2016

(65) Prior Publication Data

US 2017/0337463 A1 Nov. 23, 2017

Related U.S. Application Data

(60) Provisional application No. 62/337,566, filed on May 17, 2016.

(51) Int. Cl.
*G06N 3/04* (2006.01)
*G06N 3/08* (2006.01)

(52) U.S. Cl.
CPC ........... *G06N 3/04* (2013.01); *G06N 3/08* (2013.01)

(58) Field of Classification Search
None
See application file for complete search history.

(56) References Cited

U.S. PATENT DOCUMENTS 9,189,458 B1 * 11/2015 Langer .................. G06F 17/16
2010/0257174 A1 10/2010 Minuti
2016/0098633 A1 * 4/2016 Min .......................... G06N 3/08
706/25

FOREIGN PATENT DOCUMENTS

CN 101387632 A 3/2009
CN 104836498 A 8/2015
JP H07141316 A 6/1995

OTHER PUBLICATIONS

"Approximation With Kronecker Products," C.F. Van Loan and N. Pitsianis, M. S. Moonen et al. (eds.), Linear Algebra/ar Large Seale and Real-Time Applieatians, 293-314. © 1993 Kluwer Aeademie Publishers. (Year: 1993).*

(Continued)

*Primary Examiner* — Hal Schnee
(74) *Attorney, Agent, or Firm* — Slater Matsil, LLP (57) ABSTRACT

The present disclosure is drawn to the reduction of parameters in fully connected layers of neural networks. For a layer whose output is defined by y=Wx, where y is the output vector, x is the input vector, and W is a matrix of connection parameters, vectors $u_{ij}$ and $v_{ij}$ are defined and submatrices $W_{i,j}$ are computed as the outer product of $u_{ij}$ and $v_{ij}$, so that $W_{i,j}=v_{ij} \otimes u_{ij}$, and W is obtained by appending submatrices $W_{i,j}$.

18 Claims, 8 Drawing Sheets

(56) References Cited

OTHER PUBLICATIONS

"Tensorizing Neural Networks," Alexander Novikov, Dmitry Podoprikhin, Anton Osokin, Dmitry Vetrov; arXiv:1509.06569v2, Submitted on Sep. 22, 2015 (v1), last revised Dec. 20, 2015 (this version, v2) (Year: 2015).*
Yu Cheng et al., "Fast Neural Networks with Circulant Projections", arXiv Version 1, Feb. 11, 2015.
Yu Cheng, et al., "An Exploration of Parameter Redundancy in Deep Networks with Circulant Projections", arXiv Version 2, Oct. 27, 2015.
Misha Denil et al., "Predicting Parameters in Deep Learning", arXiv Version 2, Oct. 27, 2014.
Emily Denton et al., "Exploiting Linear Structure Within Convolutional Networks for Efficient Evaluation", arXiv Version 2, Jun. 9, 2014.
Max Jaderberg et al., "Speeding up Convolutional Neural Networks with Low Rank Expansions", arXiv Version 1, May 15, 2014.
Andrew S. Davis et al., "Low-Rank Approximations for Conditional Feedforward Computation in Deep Neural Networks", arXiv Version 4, Jan. 28, 2014.
Tara N. Sainath et al., "Low-Rank Matrix Factorization for Deep Neural Network Training with High Dimensional Output Targets", 2013.
Cheng Tai et al., "Convolutional Neural Networks with Low-Rank Regularization", arXiv Version 3, Feb. 14, 2016.

* cited by examiner

REDUCTION OF PARAMETERS IN FULLY CONNECTED LAYERS OF NEURAL NETWORKS

CROSS-REFERENCE TO RELATED APPLICATIONS

The present application claims priority under 35 U.S.C. 119(e) of U.S. Provisional Patent Application No. 62/337,566 filed on May 17, 2016, the contents of which are hereby incorporated by reference.

TECHNICAL FIELD

The present disclosure relates to creating layers for neural networks and particularly, to creating fully connected layers.

BACKGROUND OF THE ART

Artificial neural networks are mathematical models inspired by biological neural networks. They are used to approximate functions that can depend on a large number of unknown inputs. Neural networks are generally presented as systems of interconnected "neurons" which exchange messages between each other. The connections may have numeric weights that can be tuned using various optimization methods, for example stochastic gradient descent.

A deep neural network is made up of many layers. A layer, for example, may have n inputs ($x_1, x_2, \ldots, x_n$) and m outputs ($y_1, y_2, \ldots, y_m$). The number of inputs may be different from the number of outputs, and may also be different for different layers. Each layer maps the inputs to the outputs, in a way that is specific to the type of layer. The outputs from one layer may be the inputs to the next layer.

One type of layer found in neural networks is a fully connected layer. It connects every input to every output, such that $y_i = w_{i,1}*x_1 + w_{i,2}*x_2 + \ldots + w_{i,n}*x_n$. This may also be represented using matrices as $y = W \cdot x$, where W is an m x n matrix. When implementing the neural network on a computer, n x m parameters are loaded from memory and n x m computations are performed. Some of the larger layers of neural networks have up to n=9216 and m=4096. With 32-bit weights, this requires 150 MB for each iteration. Memory bandwidth is expensive in embedded device implementations.

Therefore, there is a need for improvement.

SUMMARY

The present disclosure is drawn to the reduction of parameters in fully connected layers of neural networks. For a layer whose output is defined by $y = Wx$, where y is the output vector, x is the input vector, and W is a matrix of connection parameters, vectors $u_{ij}$ and $v_{ij}$ are defined and submatrices $W_{i,j}$ are computed as the outer product of $u_{ij}$ and $v_{ij}$, so that $W_{i,j} = v_{ij} \otimes u_{ij}$, and W is obtained by appending submatrices $W_{i,j}$.

In accordance with a broad aspect, there is provided a method for creating a neural network layer. An n-dimensional input vector x and an m-dimensional output vector y are defined. The output vector y is partitioned into equally sized subvectors $y_i$ of length s and partitioning the input vector x into equally sized subvectors $x_j$ of length t. A vector $u_{ij}$ of length t and a vector $v_{ij}$ of length s are defined for $i=(1, \ldots, m/s)$ and $j=(1, \ldots, n/t)$. Submatrices $W_{ij}$ are computed as an outer product of the vector $u_{ij}$ and the vector $v_{ij}$ so that $W_{ij} = u_{ij}^T \otimes v_{ij}$, and the output vector y is determined from $y = W \cdot x$, where W is a matrix composed of all submatrices $W_{ij}$ for $i=(1, \ldots, m/s)$ and $j=(1, \ldots, n/t)$.

In some embodiments, determining the output vector y from $y = W \cdot x$ comprises computing $y_i = \Sigma_{j=1}^{n/t}(W_{ij}x_j)$ and determining the output vector y as $y = [y_1, y_2, y_3, ym_{/s}]$.

In some embodiments, determining the output vector y from $y = W \cdot x$ comprises appending submatrices $W_{ij}$ to obtain matrix W and computing $y = W \cdot x$.

In some embodiments, the method further comprises storing the vectors $v_{ij}$ and $u_{ij}$. In some embodiments, the method further comprises retrieving the vectors $v_{ij}$ and $u_{ij}$ to compute the matrices $W_{i,h}$.

In some embodiments, the neural network is a feedforward neural network and/or a deep neural network.

In some embodiments, the method further comprises learning the vectors $u_{ij}$ and $v_{ij}$ during a training phase of the neural network.

In accordance with another broad aspect, there is provided a system for creating a neural network layer. The system comprises a processing unit and a non-transitory memory communicatively coupled to the processing unit and comprising computer-readable program instructions. The instructions are executable by the processing unit for defining an n-dimensional input vector x and an m-dimensional output vector y. The output vector y is partitioned into equally sized subvectors $y_i$ of length s and partitioning the input vector x into equally sized subvectors $x_j$ of length t. A vector $u_{ij}$ of length t and a vector $v_{ij}$ of length s are defined for $i=(1, \ldots, m/s)$ and $j=(1, \ldots, n/t)$. Submatrices $W_{ij}$ are computed as an outer product of the vector $u_{ij}$ and the vector $v_{ij}$ so that $W_{ij} = u_{ij}^T \otimes v_{ij}$, and the output vector y is determined from $y = W \cdot x$, where W is a matrix composed of all submatrices $W_{ij}$ for $i=(1, \ldots, m/s)$ and $j=(1, \ldots, n/t)$.

In accordance with yet another broad aspect, there is provided a method for implementing a neural network layer. The method comprises receiving an n-dimensional input vector x and retrieving from memory vector $v_{ij}$ of length s and vector $u_{ij}$ of length t. The input vector x is partitioned into equally sized subvectors $x_j$ of length t and submatrices $W_{ij}$ are computed as an outer product of the vector $u_{ij}$ and the vector $v_{ij}$ so that $W_{ij} = u_{ij}^T \otimes v_{ij}$. The output vector y is determined from $y = W \cdot x$, where W is a matrix composed of all submatrices $W_{ij}$ for $i=(1, \ldots, m/s)$ and $j=(1, \ldots, n/t)$.

In some embodiments, determining the output vector y from $y = W \cdot x$ comprises computing $y_i = \Sigma_{j=1}^{n/t}(W_{ij}x_j)$ and determining the output vector y as $y = [y_1, y_2, y_3, \ldots, y_{/s}]$.

In some embodiments, determining the output vector y from $y = W \cdot x$ comprises appending submatrices $W_{ij}$ to obtain matrix W and computing $y = W \cdot x$.

In some embodiments, the neural network is a feedforward neural network and/or a deep neural network.

In accordance with another broad aspect, there is provided a system for implementing a neural network layer. The system comprises a processing unit and a non-transitory memory communicatively coupled to the processing unit and comprising computer-readable program instructions. The instructions are executable by the processing unit for receiving an n-dimensional input vector x and retrieving from memory vector $v_{ij}$ of length s and vector $u_{ij}$ of length t. The instructions are also executable for partitioning the input vector x into equally sized subvectors $x_j$ of length t and computing submatrices $W_{ij}$ as an outer product of the vector $u_{ij}$ and the vector $v_{ij}$ so that $W_{ij} = u_{ij}^T \otimes v_{ij}$. The output vector y is determined from $y = W \cdot x$, where W is a matrix composed of all submatrices $W_{ij}$ for $i=(1, \ldots, m/s)$ and $j=(1, \ldots, n/t)$.

In some embodiments, determining the output vector y from y=W·x comprises computing $y_i=\Sigma_{j=1}^{n/t}(W_{ij}x_j)$ and determining the output vector y as $y=[y_1, y_2, y_3, \ldots, y_{m/s}]$.

In some embodiments, determining the output vector y from y=W·x comprises appending submatrices $W_{ij}$ to obtain matrix W and computing y=W·x.

In some embodiments, the neural network is a feedforward neural network and/or a deep neural network.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
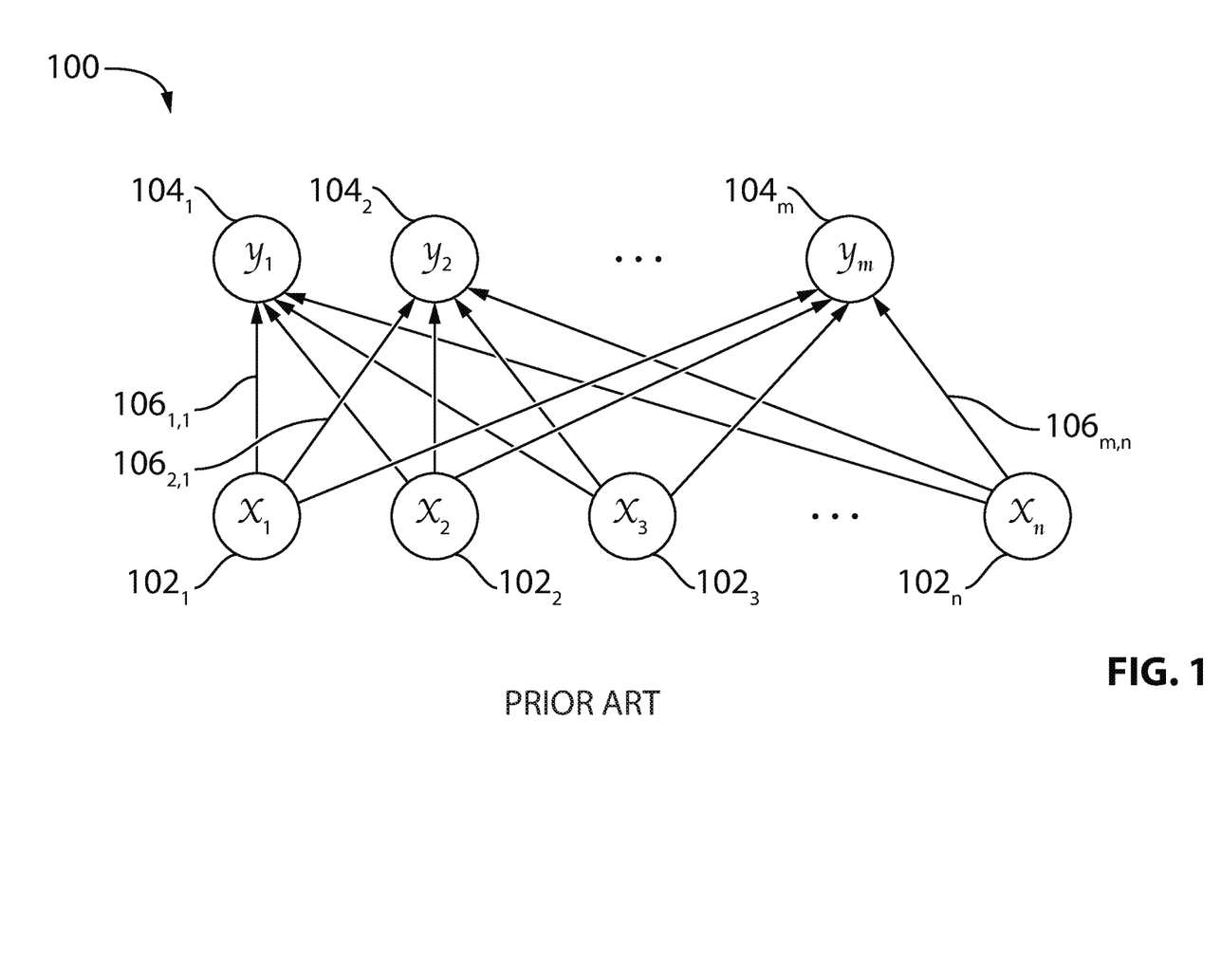
FIG. 1 is a graphical illustration of a fully connected layer of a neural network, as per the prior art.

Referring to FIG. 1, there is illustrated a fully connected layer 100 of a neural network (not shown), as per the prior art. In this example, n inputs $102_1$, $102_2$, $102_3$ ... $102_n$ are connected to m outputs $104_1$, $104_2$, ... $104_m$. More specifically, each input $102_1$, $102_2$, $102_3$ ... $102_n$ is connected to each output $104_1$, $104_2$, ... $104_m$ via a direct connection $106_{1,1}$, $106_{2,1}$, ... $106_{m,n}$. Each connection $106_{1,1}$, $106_{2,1}$, ... $106_{m,n}$ corresponds to a parameter used to attenuate or amplify a signal going from the inputs $102_1$, $102_2$, $102_3$ ... $102_n$ to the outputs $104_1$, $104_2$, ... $104_m$ and/or to reverse a sign of the signal.

The n inputs $102_1$, $102_2$, $102_3$ ... $102_n$ are represented mathematically as an n-dimensional input vector x. The m outputs $104_1$, $104_2$, ... $104_m$ are represented mathematically as an m-dimensional output vector. The connections $106_{1,1}$, $106_{2,1}$, ... $106_{m,n}$ correspond to a matrix W such that the output vector y is given by:

$$y = W \cdot x \quad (1)$$

The input vector x may be partitioned into equally sized subvectors $x_j$ of length t where t is a divisor of n. Similarly, the output vector y may be partitioned into equally sized subvectors $y_i$ of length s where s is a divisor of m:

$$y=[y_1, y_2, y_3, \ldots y_{m/s}] \quad (2)$$

$$x=[x_1, x_2, x_3, \ldots, x_{n/t}] \quad (3)$$

Vectors x and y may thus be obtained by concatenation of all $x_j$ and all $y_i$ subvectors, respectively. The matrix W is partitioned into equally sized s x t dimensional submatrices $W_{i,j}$:

$$W = \begin{bmatrix} W_{1,1} & W_{1,2} & \ldots & W_{1,j} & \ldots & W_{1,\frac{n}{t}} \\ W_{2,1} & W_{2,2} & \ldots & W_{2,j} & \ldots & W_{2,\frac{n}{t}} \\ \ldots & \ldots & \ldots & \ldots & \ldots & \ldots \\ W_{i,1} & W_{i,2} & \ldots & W_{i,j} & \ldots & W_{i,\frac{n}{t}} \\ \ldots & \ldots & \ldots & \ldots & \ldots & \ldots \\ W_{\frac{m}{s},1} & W_{\frac{m}{s},2} & \ldots & W_{\frac{m}{s},j} & \ldots & W_{\frac{m}{s},\frac{n}{t}} \end{bmatrix}$$

Each submatrix $W_{i,j}$ connects the jth group of input nodes to the ith group of output nodes. The ith subvector $y_i$ of the output vector y may then be represented as:

$$y_i = \Sigma_{j=1}^{n/t} W_{i,j} \cdot x_j \quad (4)$$

Performing this computation for all $i \in \{1, 2, \ldots, m/s\}$, the entire output vector y is computed. In order to reduce the number of parameters needed for the computation of the output vector, each submatrix $W_{i,j}$ is represented as an outer product of two vectors. The first vector is vector $v_{ij}$ of length s and the second vector is vector $u_{ij}$ of length t, for all $i \in \{1, 2, \ldots, n/t\}$ and $j \in \{1, 2, \ldots, m/s\}$, so that:

$$W_{i,j} \approx v_{ij} \otimes u_{ij} \quad (5)$$

Replacing equation (5) into equation (4), the $i^{th}$ subvector $y_i$ of the output vector y becomes:

$$y_i \approx \Sigma_{j=1}^{n/t}(v_{ij} \otimes u_{ij}) \cdot x_j \quad (6)$$

Equation (6) can be equivalently written as:

$$y_i \approx \Sigma_{j=1}^{n/t} v_{ij}(u_{ij}^T x_j) \quad (7)$$

where $u_{ij}$ is a column vector and $u_{ij}^T$ is a row vector.

In equation (7), the dot product $u_{ij}^T x_j$ yields a scalar which is then multiplied by the vector $v_{ij}$. The connection between the input nodes $x_j$ and output nodes $y_i$ is graphically represented in FIG. 2 for s=2 and t=4. Input nodes $102_1$, $102_2$, $102_3$, $102_4$ are connected to output nodes $104_1$, $104_2$ via first vectors $108_1$, $108_2$, $108_3$, $108_4$ and second vectors $110_1$, $110_2$. The scalar product of $u_{ij}^T x_j$ is illustrated as intermediary node $112_1$.

Figure 2:
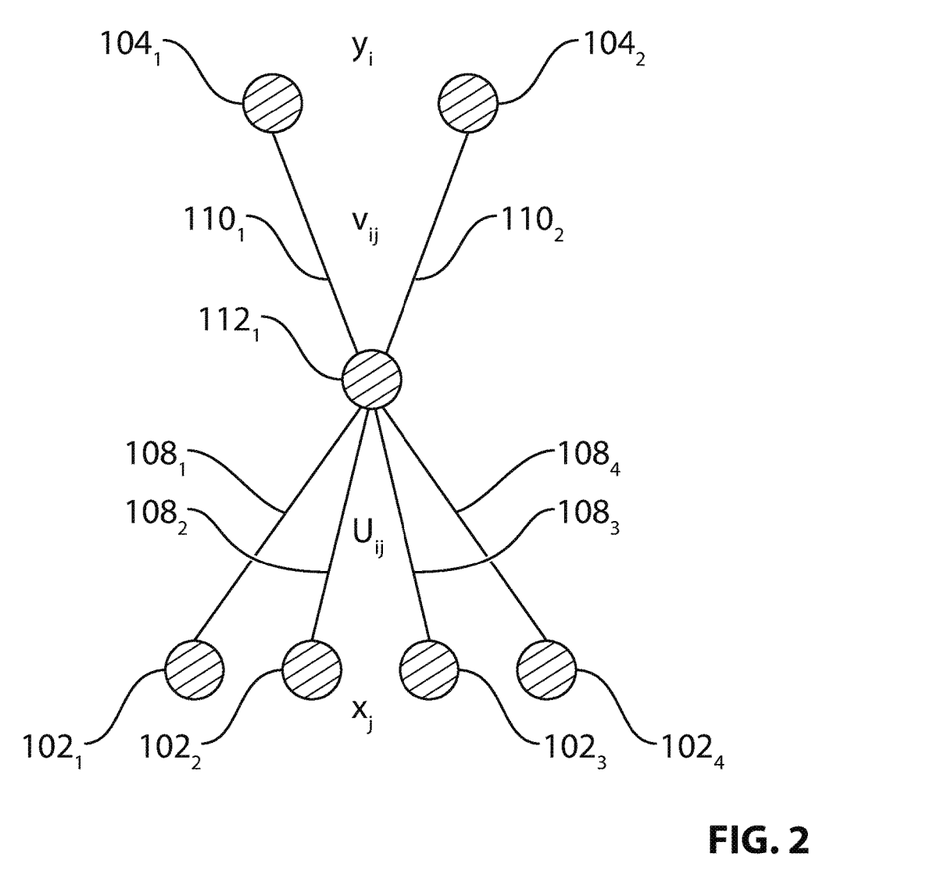
FIG. 2 is a graphical illustration of a local connection pattern between $x_j$ and $y_i$, in accordance with one embodiment.

The architecture illustrated in FIG. 2 is a local connection pattern between $x_j$ and $y_i$. It may be referred to as a tiled outer product layer for s=m and n=t, and is equivalent to a fully connected layer when s=t=1. Generally, a tiled outer product layer may have many instances of the architecture of FIG. 2 embedded in it. Using the tiled outer product layer, the number of parameters per submatrix is reduced from (s×t) to (s+t). For example, suppose the following vectors:

$$u_{ij}^T = [u_1, u_2, u_3, u_4]$$

$$v_{ij} = [v_1, v_2]$$

where $u_{ij}^T$ is a row vector and $v_{ij}$ is a column vector. The outer product, as represented by equation (5) is a 2×4 matrix as per Table 1:

TABLE 1

|  | $u_1$ | $u_2$ | $u_3$ | $u_4$ |
|---|---|---|---|---|
| $v_1$ | $u_1v_1$ | $u_2v_1$ | $u_3v_1$ | $u_4v_1$ |
| $v_2$ | $u_1v_2$ | $u_2v_2$ | $u_3v_2$ | $u_4v_2$ |

Only (2+4=6) parameters, namely $u_1, u_2, u_3, u_4$ and $v_1, v_2$ are needed to represent the (2×4=8) entries of $W_{i,j}$. Therefore, the overall number of parameters needed is reduced by a factor of:

$$\frac{s \times t}{s + t}$$

Figure 3A:
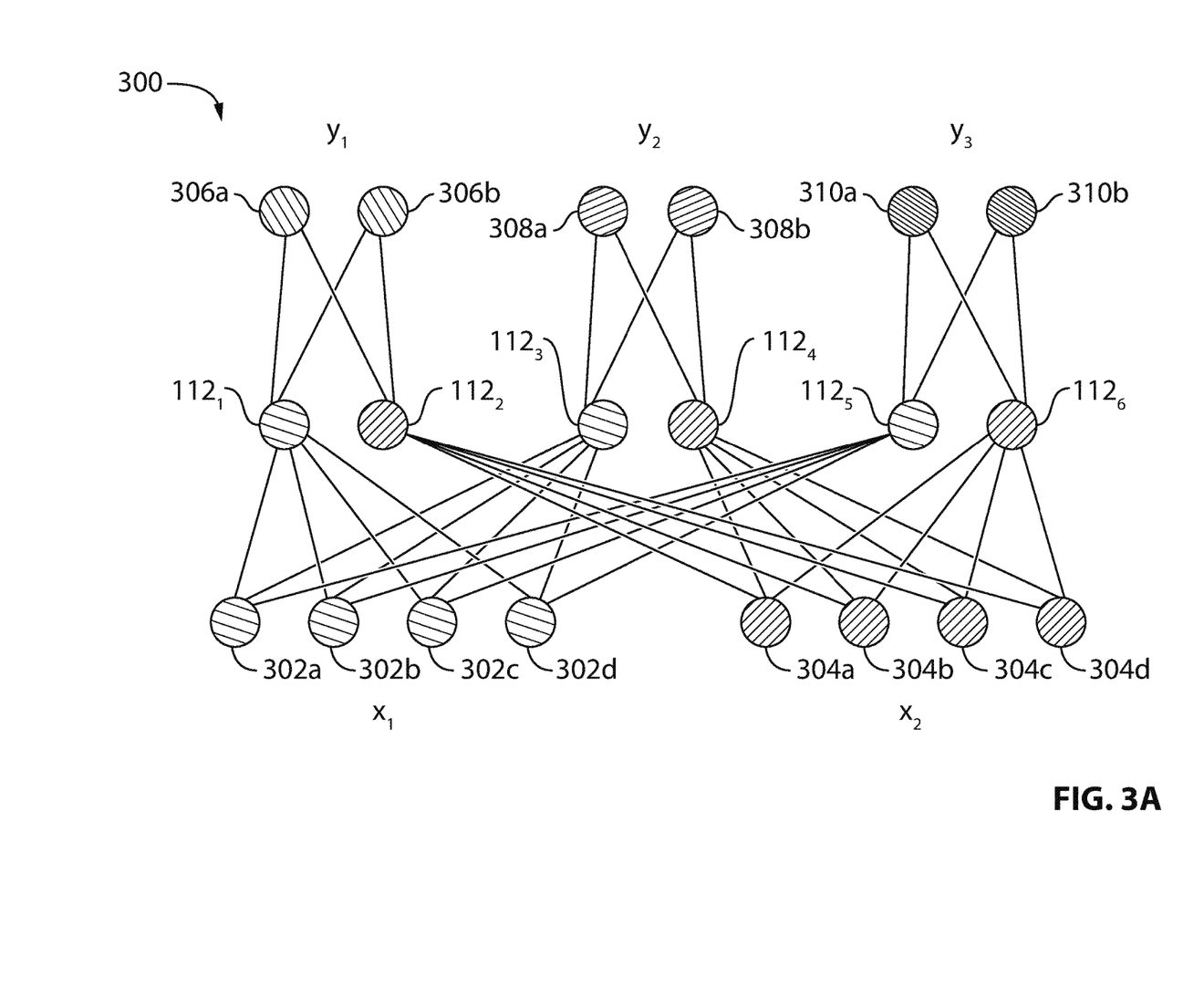
FIGS. 3A and 3B are graphical illustrations of a tiled outer product layer in accordance with two embodiments.

An example graph 300 is illustrated in FIG. 3A for n=8, m=6, s=4, t=2. In FIG. 3A, the input nodes are grouped to form two subsets $x_1$ and $x_2$. Subset $x_1$ comprises nodes 302a-d, and subset $x_2$ comprises nodes 304a-d. The middle layer is formed by nodes $112_1$ through $112_6$ in groupings of two nodes. Each node in $x_1$ is connected to a node in each of the middle groupings. As illustrated each node in $x_1$ is connected to nodes $112_1$, $112_3$ and $112_5$. Similarly, each node in $x_2$ is connected to nodes $112_2$, $112_4$ and $112_6$. Nodes $112_1$ and $112_2$ are each connected to nodes 306a and 306b, which form group $y_1$. Similarly, nodes $112_3$ and $112_4$ are connected to nodes 308a and 308b which form group $y_2$, while nodes $112_5$ and $112_6$ are connected to nodes 310a and 310b which form group $y_3$.

Figure 3B:
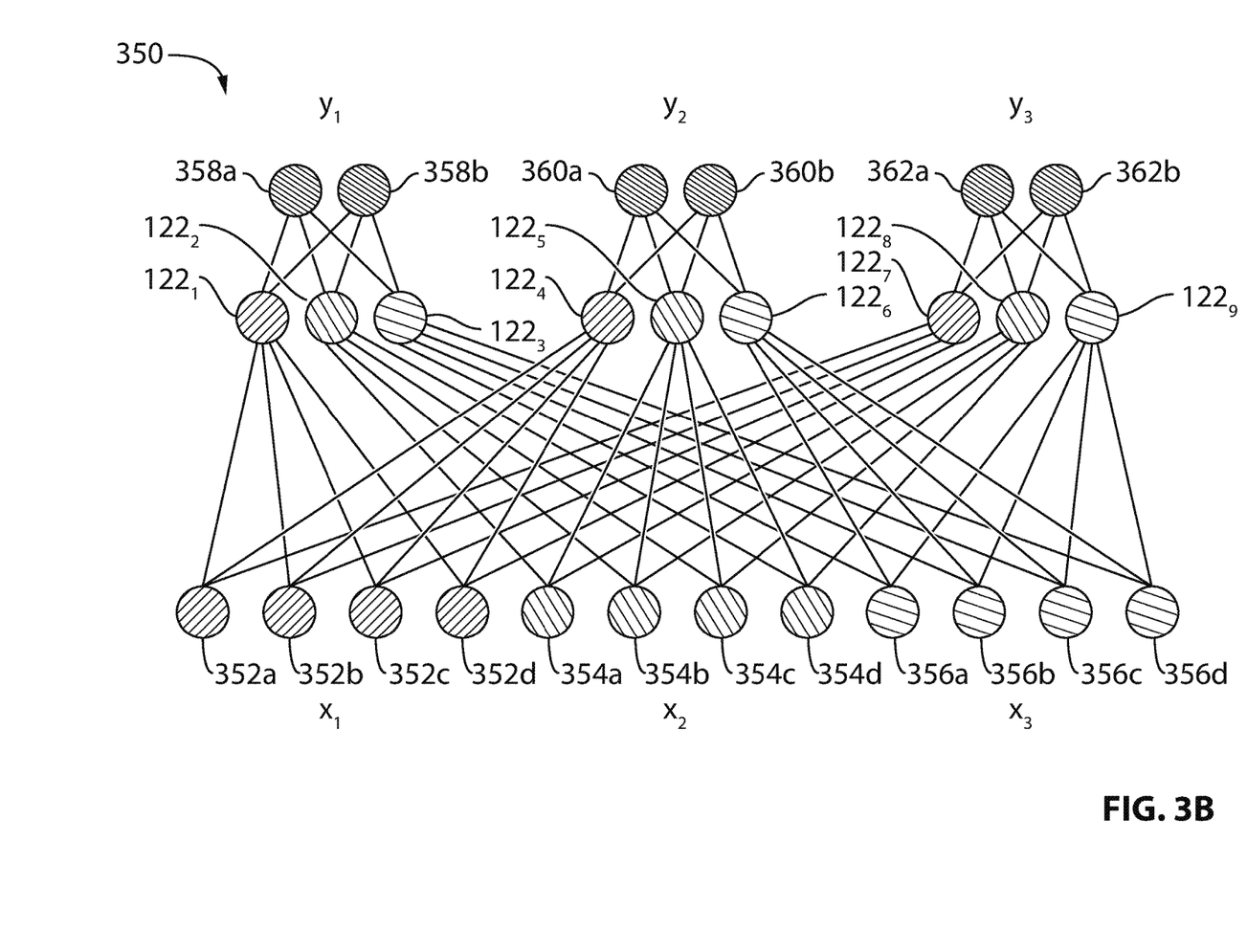

Another example graph 350 is illustrated in FIG. 3B for n=12, m=6, s=4, t=2. In graph 350, the input nodes are grouped to form three subsets $x_1, x_2, x_3$. Subset $x_1$ comprises nodes 352a-352d, subset $x_2$ comprises nodes 354a-354d, and subset $x_3$ comprises nodes 356a-356d. The middle layer is formed by nodes $122_1$ through $122_9$ in groupings of three nodes. Each node in $x_1$ is connected to a node in each of the middle groupings. More specifically, each node in $x_1$ is connected to nodes $122_1, 122_4, 122_7$. Similarly, each node in $x_2$ is connected to nodes $122_2, 122_5, 122_8$, and each node in $x_3$ is connected to nodes $122_3, 122_6, 122_9$. Nodes $122_1, 122_2, 122_3$ are each connected to nodes 356a and 356b which form group $y_1$. Similarly, nodes $122_4, 122_5, 122_6$ are each connected to nodes 360a and 360b which form group $y_2$, while nodes $122_7, 122_8, 122_9$ are each connected to nodes 362a and 362b which form group $y_3$.

In both graphs 300 and 350, there are a total of (s+t) parameters needed to represent (s×t) entries of $W_{i,j}$. It should be understood that the intermediate nodes $112_1, \ldots, 112_{nxm}$ are not actual nodes in the neural network. They are merely a graphical representation of the intermediate step performed to compute $y_i$ when the submatrix $W_{i,j}$ is represented by the outer product of two vectors $v_{ij}$ and $u_{ij}$, as per equations (5), (6), and (7).

Figure 4A:
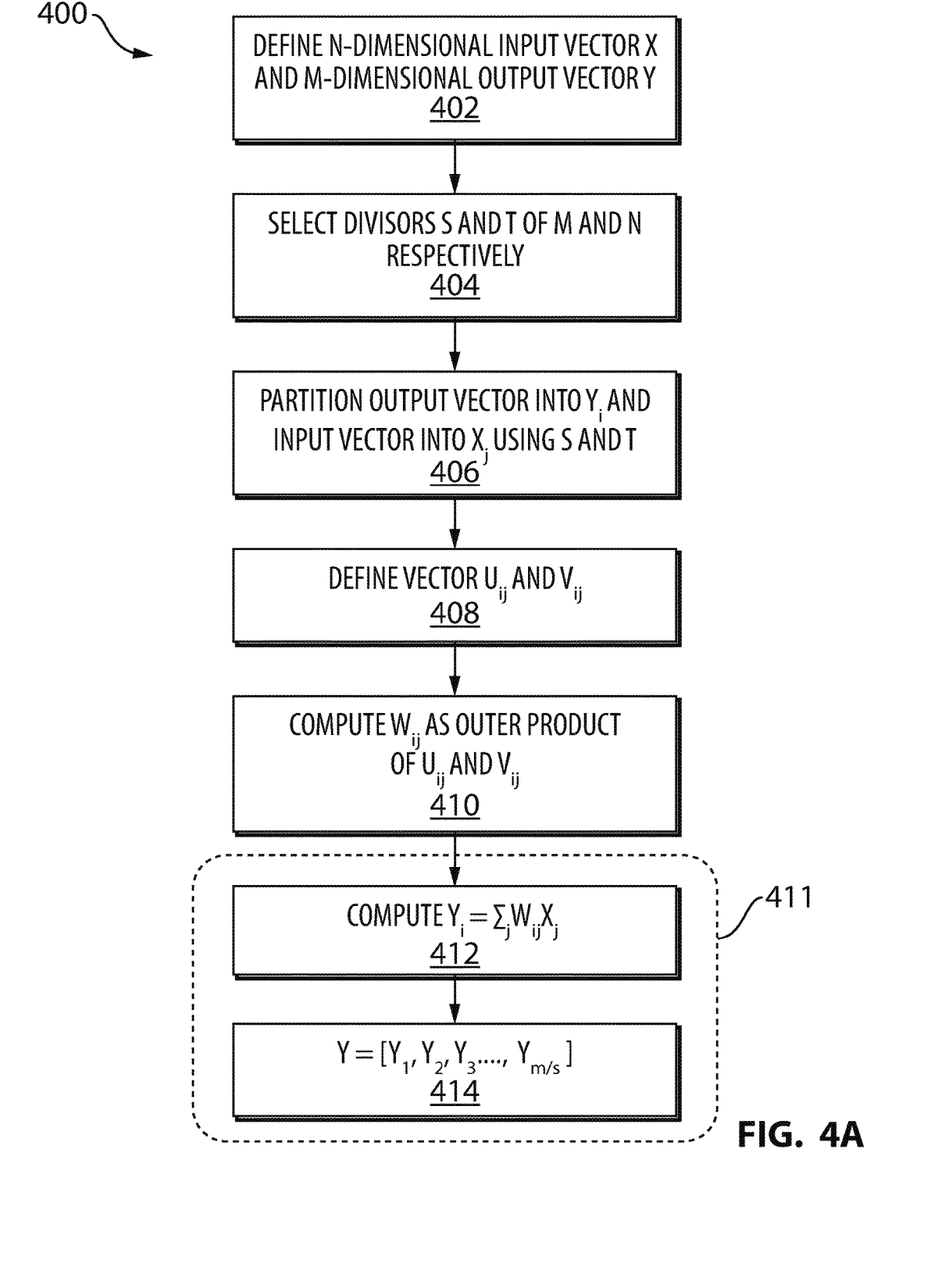
FIG. 4A is a flowchart of a method for creating a fully-connected layer for use in a neural network in accordance with a first embodiment.

Referring now to FIG. 4A, there is illustrated a method 400 for creating a layer for use in a neural network, such as but not limited to a feedforward neural network. In some embodiments, the neural network is a deep neural network. At step 402, an n-dimensional input vector and an m-dimensional output vector are defined. The input and output vectors may be of any size. In some embodiments, the input and output vectors are equal to or less than 8192 and 2048, respectively. Other embodiments may also apply.

At step 404, divisors s and t of m and n, respectively, are selected. Through this step, the tile size for the tiled product layer is set, as used in tiled (or blocked) matrix-vector or matrix-matrix multiplication, where s corresponds to the height of the tile and t corresponds to the width of the tile. In some embodiments, the divisors s and t are equal to or less than 64 and 64, respectively.

At step 406, the input vector and the output vector are each partitioned using the divisors s and t. Specifically, the output vector y is partitioned into equally sized subvectors $y_i$ of length s, where $y=[y_1, y_2, y_3, \ldots, y_{m/s}]$ and the input vector x is partitioned into equally sized subvectors $x_i$ of length t, where $x=[x_1, x, x_3, \ldots, x_{n/t}]$.

At step 408, a vector $u_{ij}$ of length t and a vector $v_{ij}$ of length s are defined for $i=(1, \ldots, m/s)$ and $j=(1, \ldots, n/t)$. At step 410, the outer product of $u_{ij}$ and $v_{ij}$ is computed to produce submatrices $W_{ij}$, so that $W_{ij}=u_{ij}^T \otimes v_{ij}$. Once the submatrices $W_{ij}$ are computed from the outer product of $u_{ij}$ and $v_{ij}$, the output vector y is determined from y=W·x, where W is a matrix composed of all submatrices $W_{ij}$ for $i=(1, \ldots, m/s)$ and $j=(1, \ldots, n/t)$, as per step 411.

An embodiment of step 411 is illustrated at steps 412 and 414. At step 412, output subvector $y_i$ is computed as the product of $W_{ij}$ and $x_j$, so that $y_i = \sum_{j=1}^{n/t} v_{ij}(u_{ij}^T x_j)$. At step 414, all $y_i$ values are concatenated to obtain the output vector y.

Figure 4B:
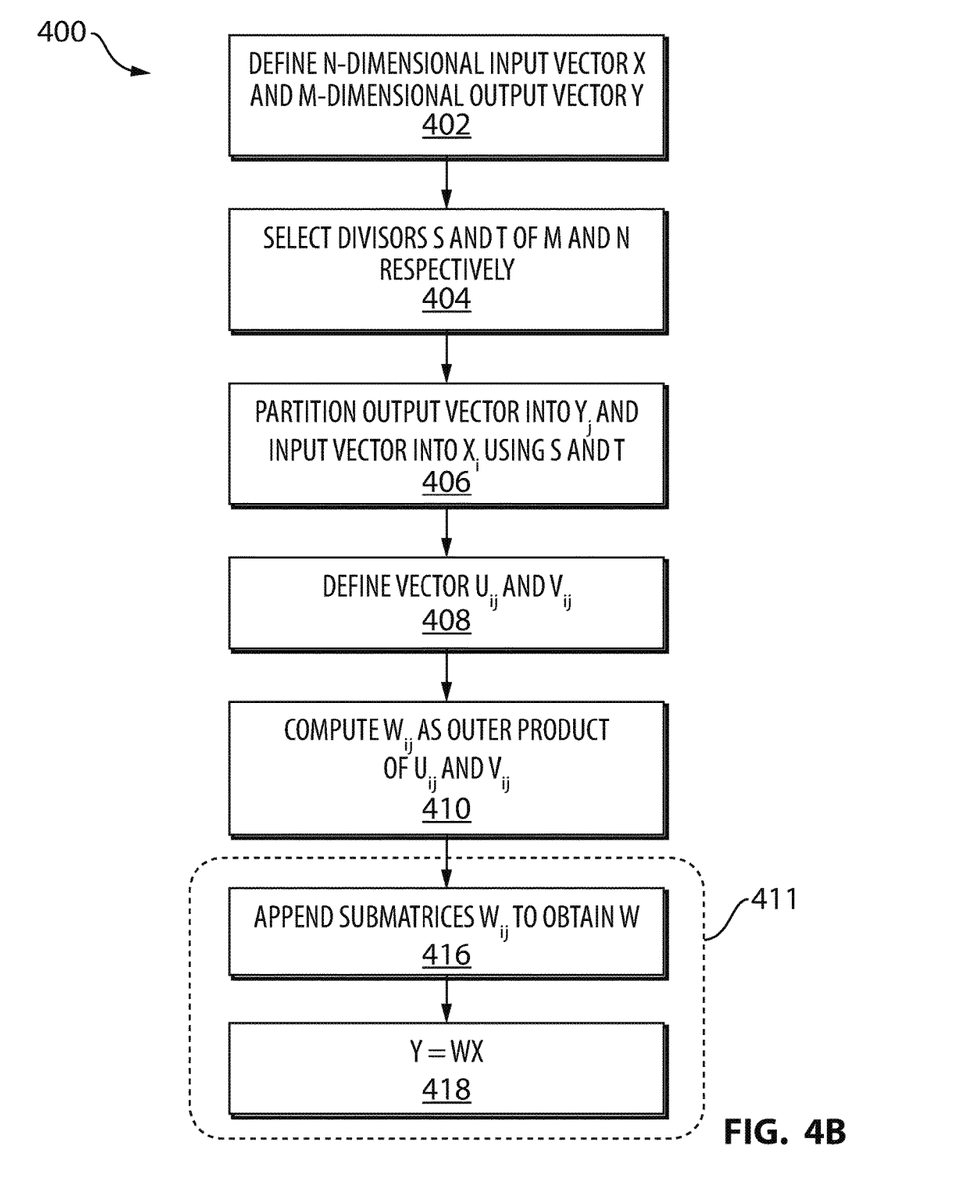
FIG. 4B is a flowchart of a method for creating a fully-connected layer for use in a neural network in accordance with a second embodiment.

An alternative embodiment of step 411 is illustrated in FIG. 4B at steps 416 and 418. At step 416, submatrices $W_{ij}$ are appended to obtain matrix W, such that:

$$W = \begin{bmatrix} W_{1,1} & W_{1,2} & \ldots & W_{1,j} & \ldots & W_{1,\frac{n}{t}} \\ W_{2,1} & W_{1,2} & \ldots & W_{2,j} & \ldots & W_{2,\frac{n}{t}} \\ \ldots & \ldots & \ldots & \ldots & \ldots & \ldots \\ W_{i,1} & W_{i,2} & \ldots & W_{i,j} & \ldots & W_{i,\frac{n}{t}} \\ \ldots & \ldots & \ldots & \ldots & \ldots & \ldots \\ W_{\frac{m}{s},1} & W_{\frac{m}{s},2} & \ldots & W_{\frac{m}{s},j} & \ldots & W_{\frac{m}{s},\frac{n}{t}} \end{bmatrix}$$

At step 418, the output vector y is obtained as the product of matrix W and input vector x: y=Wx.

In some embodiments, the method 400 comprises a step of storing vectors $v_{ij}$ and $u_{ij}$. Therefore, instead of storing each submatrix $W_{ij}$, the vectors $v_{ij}$ and $u_{ij}$ are stored, and $W_{ij}$ is computed during feed-forward using the outer products when $v_{ij}$ and $u_{ij}$ are retrieved. During training, the parameters $v_{ij}$ and $u_{ij}$ are learned.

Figure 5:
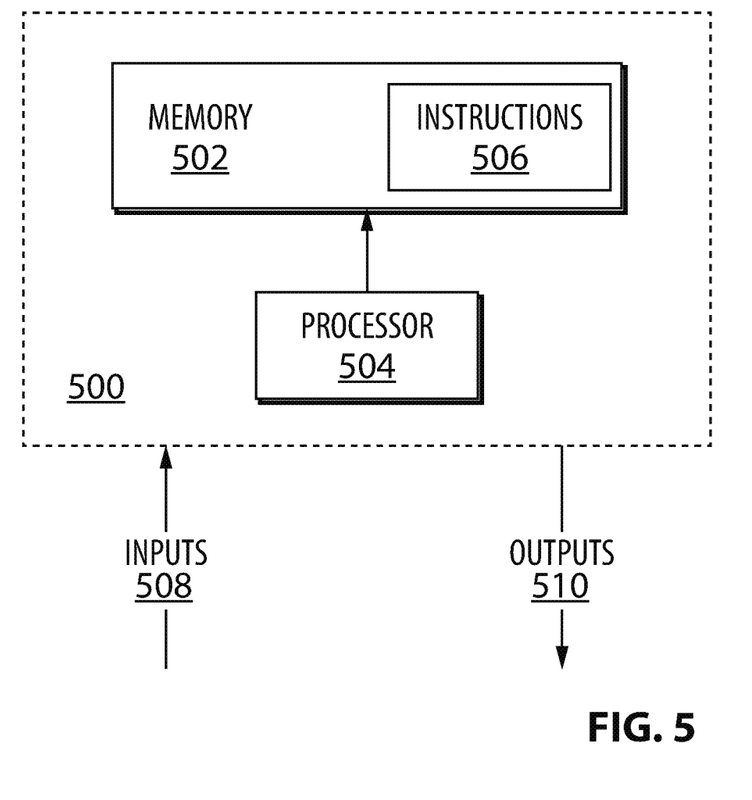
FIG. 5 is a block diagram of an example system for implementing the method of FIGS. 4A and 4B.

Referring to FIG. 5, the methods of FIGS. 4A and 4B may be implemented on one or more computing device 500. Computing device 500 may comprise one or more processors 504 and one or more computer-readable memories 502 storing machine-readable instructions 506 executable by processor 504 and configured to cause processor 504 to generate one or more outputs 510 based on one or more inputs 508. The inputs may comprise values for any one of m, n, s, and t. The inputs 508 may also comprise the input and/or output vectors x and y, respectively. The outputs 510 may comprise the vectors $v_{ij}$ and $u_{ij}$, the outer product of vectors $v_{ij}$ and $u_{ij}$, and/or the output subvectors $y_i$ as defined by equations (6) or (7). In some embodiments, the outputs 510 comprise the submatrices $W_{ij}$ after having been computed from the outer product of $v_{ij}$ and $u_{ij}$. Other inputs 508 and outputs 510 may also apply.

Processor 504 may comprise any suitable device(s) configured to cause a series of steps to be performed by computer 500 so as to implement a computer-implemented process such that instructions 506, when executed by computer 500 or other programmable apparatus, may cause the functions/acts specified in the methods described herein to be executed. Processor 504 may comprise, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 502 may comprise any suitable known or other machine-readable storage medium. Memory 502 may comprise non-transitory computer readable storage medium such as, but not limited to, an electronic, magnetic, optical, electromagnetic, infrared, or semiconductor system, apparatus, or device, or any suitable combination of the foregoing. Memory 502 may include a suitable combination of any type of computer memory that is located either internally or externally to computer 500 such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 502 may comprise any storage means (e.g. devices) suitable for retrievably storing machine-readable instructions 506 executable by processor 504.

Various aspects of the present disclosure may be embodied as systems, devices, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g., memory 502) having computer readable program code (e.g., instructions 506) embodied thereon. The computer program product may, for example, be executed by computer 500 to cause the execution of one or more methods disclosed herein in entirety or in part.

Computer program code for carrying out operations for aspects of the present disclosure in accordance with instructions 506 may be written in any combination of one or more programming languages, including an object oriented programming language such as Java, Smalltalk, C++ or the like and conventional procedural programming languages, such as the "C" programming language or other programming languages. Such program code may be executed entirely or in part by computer 500 or other processing device(s). It is understood that, based on the present disclosure, one skilled in the relevant arts could readily write computer program code for implementing the methods disclosed herein.

In some embodiments, computer 500 may be used to perform a method for implementing a neural network having at least one layer. An n-dimensional input vector x is received as input 508. The method comprises retrieving from memory first vectors $v_{ij} \in \mathbb{R}^s$ and second vectors $u_{ij} \in \mathbb{R}^t$, where s is a divisor of m and t is a divisor of n for partitioning an output vector y into equally sized subvectors $y_i \in \mathbb{R}^s$ and partitioning the input vector x into equally sized subvectors $x_j \in \mathbb{R}^t$. The instructions 506 are configured to compute the outer products of the first vectors $v_{ij}$ and the second vectors $u_{ij}$ to obtain the submatrices $W_{ij} \in \mathbb{R}^{s \times t}$, and to compute output subvectors $y_i$ as $y_i = \sum_{j=1}^{n/t} W_{i,j} \cdot x_j$. Alternatively, the instructions 506 are configured to compute the output subvectors $y_i$ as $y_i = \sum_{j=1}^{n/t} (v_{ij} \otimes u_{ij}) \cdot x_j$. The output subvectors $y_i$ may be provided as part of outputs 510.

Computer-executable instructions 506 may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Figure 6:
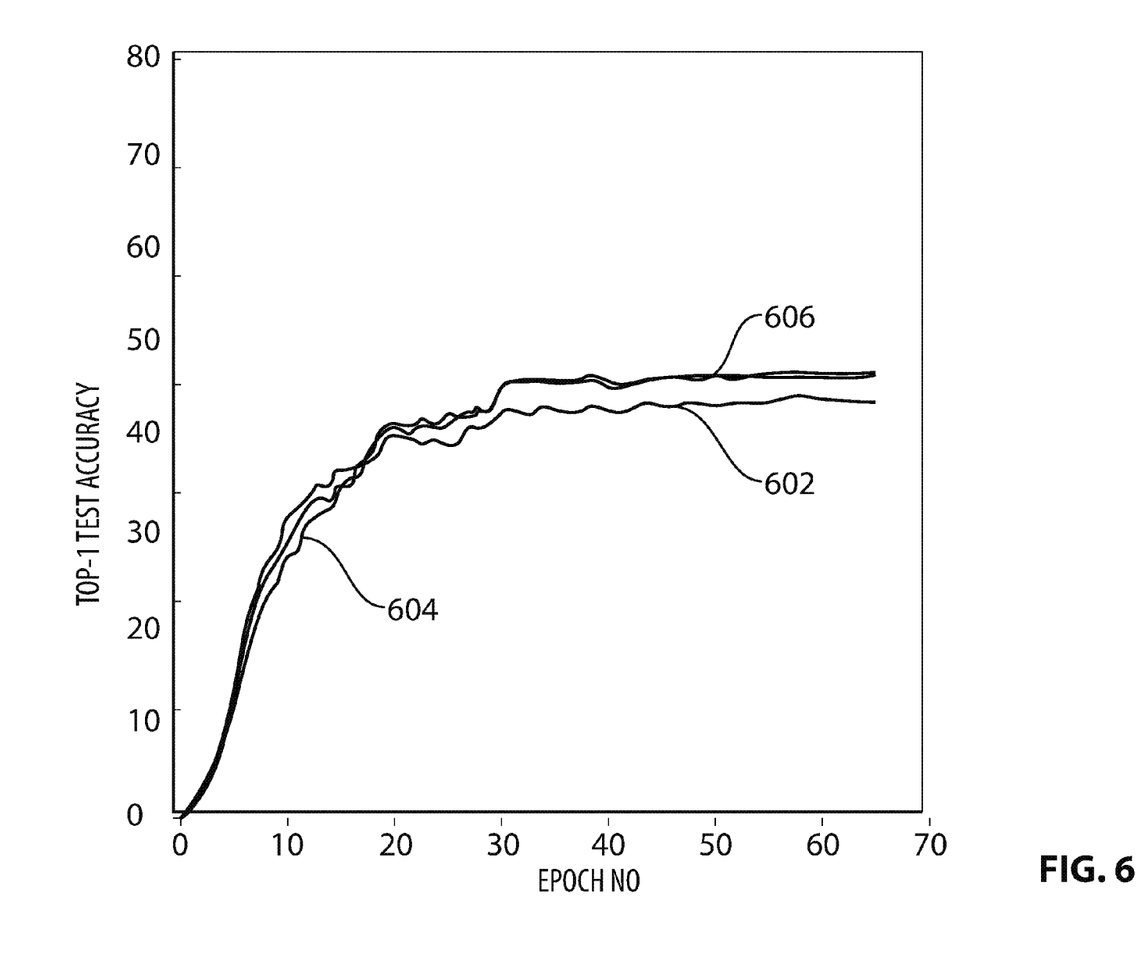
FIG. 6 is a comparative graph of the accuracy of a network having a fully connected layer compared to the same network having the fully connected layer replaced by a tiled outer product layer.

Referring to FIG. 6, there is illustrated a graph comparing the accuracy obtained with a neural network containing a fully connected layer 602 to the accuracy obtained with the same network with the fully connected layer replaced with a tiled outer product layer 604, 606, according to an embodiment similar to that described above, using the same data set with different parameters. The neural network 604 contains tiled outer product layer with n=8192, m=2048, s=64, t=32. The neural network 606 contains tiled outer product layer with n=8192, m=2048, s=64, t=64. As shown, the accuracy is substantially similar, and the networks with tiled outer product layers 604, 606 use less parameters, thus leading to a savings in memory space. The savings are proportional to (s*t)/(s+t).

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The appended claims are to encompass within their scope all such changes and modifications.

The invention claimed is:

1. A method for reducing a number of learnable parameters in a fully connected layer of a neural network, the fully connected layer comprising n inputs and m outputs, the method comprising:
   defining an n-dimensional input vector x representative of n inputs of the layer of the neural network and defining an m-dimensional output vector y representative of the m outputs of the layer;
   selecting a divisor s of m and a divisor t of n;
   partitioning the output vector y into equally sized subvectors $y_i$ of length s and partitioning the input vector x into equally sized subvectors $x_j$ of length t;
   learning a vector $u_{ij}$ comprising t learnable parameters and a vector $v_{ij}$ comprising s learnable parameters for i=(1, . . . , m/s) and j=(1, . . . , n/t) during a training phase of the neural network;
   computing submatrices $W_{ij}$ as an outer product of the vector $u_{ij}$ and the vector $v_{ij}$ so that $W_{ij} = u_{ij}^T \otimes v_{ij}$; and
   computing the output vector y representative of the m outputs of the layer from the input vector x and the submatrices $W_{ij}$.

2. The method of claim 1, wherein computing the output vector y representative of the m outputs of the layer from the input vector x and the submatrices $W_{ij}$ comprises:
   computing $y_i = \sum_{j=1}^{n/t} (W_{ij} x_j)$ for i=(1, . . . . m/s); and
   appending all subvectors $y_i$ to obtain the output vector y as $y=[y_1, y_2, y_3, \ldots y_{m/s}]$.

3. The method of claim 1, wherein computing the output vector y representative of the m outputs of the layer from the input vector x and the submatrices $W_{ij}$ comprises:
   appending submatrices $W_{ij}$ for i=(1, . . . , m/s) and j=(1, . . . , n/t) to obtain matrix W; and computing y=W·x.

4. The method of claim 1, further comprising storing the vectors $v_{ij}$ and $u_{ij}$.

5. The method of claim 1, wherein computing the output vector y representative of the m outputs of the layer from the input vector x and the submatrices $W_{ij}$ comprises:

computing $y_i = \sum_{j=1}^{n/t} v_{ij}(u_{ij}^T x_j)$ for i=(1, . . . ,m/s); and appending all subvectors $y_i$ to obtain the output vector y as y=[$y_1, y_2, y_3, \ldots, y_{m/s}$].

6. A system comprising:

a processing unit; and a non-transitory memory communicatively coupled to the processing unit and comprising computer-readable program instructions executable by the processing unit for reducing a number of learnable parameters in a fully connected layer of a neural network comprising n inputs and m outputs by:

defining an n-dimensional input vector x representative of the n inputs of the aver and defining an m-dimensional output vector y representative of the m outputs of the layer;

selecting a divisor s of m and a divisor t of n;

partitioning the output vector y into equally sized subvectors $y_i$ of length s and partitioning the input vector x into equally sized subvectors $x_j$ of length t;

learning a vector $u_{ij}$ comprising t learnable parameters and a vector $v_{ij}$ comprising s learnable parameters for i=(1, . . . , m/s) and j=(1, . . . , n/t) during a training phase of the neural network;

computing submatrices $W_{ij}$ as an outer product of the learned vector $u_{ij}$ and the learned vector $v_{ij}$ so that $W_{ij} = u_{ij}^T \otimes v_{ij}$; and computing the output vector y representative of the m outputs of the layer from the input vector x and the submatrices $W_{ij}$.

7. The system of claim 6, wherein computing the output vector y representative of the m outputs of the layer from the input vector x and the submatrices $W_{ij}$ comprises:

computing $y_i = \sum_{j=1}^{n/t} (W_{ij} x_j)$ for i=(1, . . . , m/s); and appending all subvectors $y_i$ to obtain the output vector y as y=[$y_1, y_2, y_3, \ldots, y_{m/s}$].

8. The system of claim 6, wherein computing the output vector y representative of the m outputs of the layer from the input vector x and the submatrices $W_{ij}$ comprises:

appending submatrices $W_{ij}$ for i=(1, . . . , m/s) and j=(1, . . . , n/t) to obtain matrix W; and computing y=W·x.

9. The system of claim 6, the non-transitory memory further comprising computer-readable program instructions executable by the processing unit for storing the vectors $v_{ij}$ and $u_{ij}$.

10. The system of claim 6, wherein computing the output vector y representative of the m outputs of the layer from the input vector x and the submatrices $W_{ij}$ comprises:

computing $y_i = \sum_{j=1}^{n/t} v_{ij}(u_{ij}^T x_j)$ for i=(1, . . . , m/s); and appending all subvectors $y_i$ to obtain the output vector y as y=[$y_1, y_2, y_3, \ldots, y_{m/s}$].

11. A method for implementing a neural network layer comprising n inputs and m outputs, the method comprising:

receiving an n-dimensional input vector x representative of the n inputs of the layer of a neural network;

computing an m-dimensional output vector y representative of the m outputs of the layer of the neural network by:

retrieving from memory a vector $v_{ij}$ comprising s learned parameters and a vector $u_{ij}$ comprising t learned parameters, wherein the vectors $u_{ij}$ and $v_{ij}$ are learned during a training phase of the neural network;

partitioning the output vector y into equally sized subvectors $y_i$ of length s and partitioning the input vector x into equally sized subvectors $x_j$ of length t;

computing submatrices $W_{ij}$ as an outer product of the vector $u_{ij}$ and the vector $v_{ij}$ so that $W_{ij} = u_{ij}^T \otimes v_{ij}$; and computing the output vector y from the input vector x and the submatrices $W_{ij}$; and outputting the output vector y as the m outputs of the neural network layer.

12. The method of claim 11, wherein computing the output vector y from the input vector x and the submatrices $W_{ij}$ comprises:

computing $y_i = \sum_{j=1}^{n/t} (W_{ij} x_j)$ for i=(1, . . . , m/s); and appending all subvectors $y_i$ to obtain the output vector y as y=[$y_1, y_2, y_3, \ldots, y_{m/s}$].

13. The method of claim 11, wherein computing the output vector y from the input vector x and the submatrices $W_{ij}$ comprises:

appending submatrices $W_{ij}$ to obtain matrix W; and computing y=W·x.

14. The method of claim 11, wherein computing the output vector y from the input vector x and the submatrices $W_{ij}$ comprises:

computing $y_i = \sum_{j=1}^{n/t} v_{ij}(u_{ij}^T x_j)$ for i=(1, . . . , m/s); and appending all subvectors $y_i$ to obtain the output vector y as y=[$y_1, y_2, y_3, \ldots, y_{m/s}$].

15. A system for implementing a neural network layer comprising n inputs and m outputs, the system comprising:

a processing unit; and a non-transitory memory communicatively coupled to the processing unit and comprising computer-readable program instructions executable by the processing unit for:

receiving an n-dimensional input vector x representative of the n inputs of the layer of a neural network;

computing an m-dimensional output vector y representative of the m outputs of the layer of the neural network by:

retrieving from memory a vector $v_{ij}$ comprising s learned parameters and a vector $u_{ij}$ comprising t learned parameters, wherein the learned parameters included in the vectors $v_{ij}$ and $u_{ij}$ are learned during a training phase of the neural network;

partitioning the output vector y into equally sized subvectors $y_i$ of length s and partitioning the input vector x into equally sized subvectors $x_j$ using divisor t;

computing submatrices $W_{ij}$ as an outer product of the vector $u_{ij}$ and the vector $v_{ij}$ so that $W_{ij} = u_{ij}^T \otimes v_{ij}$; and computing the output vector y from the input vector x and the submatrices $W_{ij}$; and outputting the output vector y at the m outputs of the layer of the neural network.

16. The system of claim 15, wherein computing the output vector y from the input vector x and the submatrices $W_{ij}$ comprises:

computing $y_i = \sum_{j=1}^{n/t} (W_{ij} x_j)$ for i=(1, . . . m/s); and; and appending all subvectors $y_i$ to obtain the output vector y as y=[$y_1, y_2, y_3, \ldots, y_{m/s}$].

17. The system of claim 15, wherein computing the output vector y from the input vector x and the submatrices $W_{ij}$ comprises:

appending submatrices $W_{ij}$ for i=(1, . . . m/s) and i=(1, . . . n/t) to obtain matrix W; and computing y=W·x.

18. The system of claim 15, wherein computing the output vector y from the input vector x and the submatrices $W_{ij}$ comprises:

computing $y_i = \sum_{ij=1}^{n/t} v_{ij}(u_{ij}^T x_j)$ for i=(1, . . . , m/s); and appending all subvectors $y_i$ to obtain the output vector y as y=[$y_i, y_2, y_3, \ldots, y_{m/s}$].

* * * * *

UNITED STATES PATENT AND TRADEMARK OFFICE
CERTIFICATE OF CORRECTION

PATENT NO. : 10,509,996 B2
APPLICATION NO. : 15/258691
DATED : December 17, 2019
INVENTOR(S) : Dalton Page 1 of 1

It is certified that error appears in the above-identified patent and that said Letters Patent is hereby corrected as shown below:

In the Claims

In Column 9, Line 12, Claim 6, delete "aver" and insert --layer--.

In Column 9, Line 27, Claim 6, delete "in outputs" and insert --m outputs--.

In Column 9, Line 32, Claim 7, delete "$y_i = \sum_{j=1}^{n/t}(W_{ij}x_j))$," and insert --$y_i = \sum_{j=1}^{n/t}(W_{ij}x_j)$--.

In Column 10, Line 63, Claim 18, delete "$y_i = \sum_{ij=1}^{n/t} v_{ij}(u_{ij}^T x_j)$," and insert --$y_i = \sum_{j=1}^{n/t} v_{ij}(u_{ij}^T x_j)$--.

Signed and Sealed this
Fourth Day of August, 2020

Andrei Iancu
*Director of the United States Patent and Trademark Office*